Patented May 9, 1950

2,506,652

UNITED STATES PATENT OFFICE 2,506,652

THERMAL CHLORINOLYSIS AND BROMINOLYSIS OF FLUOROCARBONS TO PRODUCE FLUOROCARBON CHLORIDES AND BROMIDES

Joseph H. Simons, Wilbur H. Pearlson, and Thomas J. Brice, State College, Pa., assignors to Minnesota Mining & Manufacturing Company, St. Paul, Minn., a corporation of Delaware No Drawing. Application March 31, 1947, Serial No. 738,505

5 Claims. (Cl. 260—653)

This invention relates to a novel method of making fluorocarbon chlorides and fluorocarbon bromides. This method involves the vapor phase thermal chlorinolysis or brominolysis of saturated polycarbon fluorocarbons, whereby carbon-carbon bond cleavage is produced and carbon-chlorine or carbon-bromine bonds are formed. For example, $CF_2Br_2$, $CF_3Br$ and $C_2F_5Br$ are obtained in this way by brominolysis of $C_3F_8$. The fluorocarbon is heated in vapor phase in the presence of chlorine or bromine (or both) at a temperature sufficiently high to cause thermal chlorinolysis or brominolysis.

An illustrative procedure consists essentially of heating a gaseous mixture of the fluorocarbon and chlorine or bromine (or both) at a high temperature, as by passing through a tube heated by a furnace to a temperature of the order of 800–900° C., and separating the desired products from the reaction mixture, as by fractional distillation.

This method depends upon our discovery that chlorinolysis and brominolysis of the fluorocarbons can be produced at high temperatures which do not, however, cause significant loss of desired end products under the conditions prevailing.

A fluorocarbon starting material may be used which is already partially chlorinated or brominated. For example, $C_3F_7Br$ may be used. Likewise, a hydrogen-containing fluorocarbon may be used which will be chlorinated or brominated, by thermal replacement of hydrogen as the reaction mixture heats up, and the resultant fluorocarbon chloride or bromide then will be subjected to chlorinolysis or brominolysis. For example, starting with a gaseous mixture of $C_3F_7H$ and bromine, there will first be produced $C_3F_7Br$ and the latter will then be subjected to brominolysis. Accordingly, these cases are embraced by the generic scope of the present invention.

The starting compounds for this invention are generically defined as being the saturated polycarbon fluorocarbons and their monohydrides, monochlorides and monobromides; the monohydrides being included because the process first transforms them into monochlorides or monobromides which then undergo chlorinolysis or brominolysis. Alicyclic fluorocarbon compounds as well as open-chain fluorocarbon compounds may be used as starting materials and are included within the scope of the invention.

A feature of the present method is that it makes possible the production of saturated aliphatic fluorocarbon monobromides, having the formula $C_nF_{2n+1}Br$. So far as we are aware, no compound of this homologous series has previously been reported by others. These compounds are stable to light and heat and are inert to ordinary reagents. The $CF_3Br$, $C_2F_5Br$ and $C_3F_7Br$ compounds are normally gaseous and have utility as refrigerants and low-boiling solvents. The higher-boiling, normally liquid, members of the series have utility as solvents, dielectrics, hydraulic mechanism fluids, and heat transfer fluids, for example. These compounds also have value in chemical synthesis, since the bromine atom makes for chemical reactivity. For example, a Grignard reagent can be formed by reaction with magnesium in the presence of ether when precautions are taken to remove traces of water. We have previously described certain of these compounds in the Journal of the American Chemical Society, vol. 68, pp. 968–969 (June, 1946).

The following example illustrates the process as exemplified by brominolysis of a saturated polycarbon fluorocarbon having the formula $C_nF_{2n+2}$.

Example

The apparatus consisted of a one inch quartz tube having a length of 24 inches, heated by an electric furnace, the output end of which was connected to a condensing train of traps cooled successively by ice, solid carbon dioxide, and liquid air. The quartz tube was maintained at a temperature of 840–860° C.

A gaseous mixture of $C_3F_8$ and bromine was formed by passing the gaseous fluorocarbon (boiling point −38 to −35° C.) through a bromine-containing saturater heated (at 40–50° C.) to give a moderate vapor pressure of bromine. The mol ratio of $BR_2$ to $C_3F_8$ was about 1 to 1. This mixture was then passed to the quartz reaction tube at the rate of 0.2 mol of $C_3F_8$ per hour, and a total of 46.4 grams of $C_3F_8$ was used in the experiment.

The condensate collected in the solid carbon dioxide trap was warmed and was purified by passage of the vapor through 50% aqueous potassium hydroxide solution to remove bromine, $SiF_4$ and $CO_2$, etc., followed by passage through a bubbler containing concentrated sulfuric acid to remove water vapor. The purified material weighed 47 grams and was fractionated in a low-temperature fractionating column. There was obtained about 22 grams of material having a boiling range of −63 to −58° C. and a molecular weight of 150, identified as $CF_3Br$. A 6 gram fraction boiling at −42° C. and higher, molecular weight 199, was identified as a mixture of $C_2F_5Br$ and $C_3F_8$, with perhaps lesser amounts of other fluorocarbons. A small residual fraction appeared to boil in the region of 0° C. and had a molecular weight of 191; properties which correspond to the alicyclic fluorocarbon $C_4F_8$.

The ice-cooled trap yielded about 0.5 grams of condensate, which had a molecular weight of 199 and a vapor pressure at 27° C. of about 42 mm. (indicating a boiling point at atmospheric pressure of about 70–80° C.). This material appears to have been a mixture of polybromides, including $CF_2Br_2$.

What we claim is as follows:

1. A method of making a fluorocarbon monobromide which comprises passing a gaseous mixture of bromine and a polycarbon fluorocarbon, having the formula $C_nF_{2n+2}$, through a heated tube maintained at a temperature of the order of 800–900° C., so as to effect brominolysis, and recovering a reaction product having the formula $C_nF_{2n+1}Br$.

2. A method of making fluorocarbon bromides which comprises passing through a heated zone maintained at a temperature of the order of 800–900° C., a gaseous mixture of bromine and a saturated polycarbon fluorocarbon having at least three carbon atoms in the molecule, so as to effect brominolysis, and recovering at least one polycarbon fluorocarbon bromide reaction product.

3. A method of making fluorocarbon chlorides and bromides which comprises passing a gaseous mixture of a halogen of the class consisting of chlorine and bromine, and a starting compound of the class consisting of saturated polycarbon fluorocarbons and their monohydrides, monochlorides and monobromides, through a heated tube maintained at a temperature of the order of 800–900° C., so as to effect chlorinolysis or brominolysis as the case is, and recovering at least one reaction product of the class consisting of fluorocarbon chlorides and bromides.

4. A method of making fluorocarbon chlorides and bromides which comprises passing a gaseous mixture of a saturated polycarbon fluorocarbon and a halogen of the class consisting of chlorine and bromine through a heated tube maintained at a temperature of the order of 800–900° C., so as to effect chlorinolysis or brominolysis as the case is, and recovering at least one reaction product of the class consisting of fluorocarbon chlorides and bromides.

5. A method of making fluorocarbon bromides which comprises passing a gaseous mixture of bromine and a starting compound of the class consisting of saturated polycarbon fluorocarbons and their monohydrides, monochlorides and monobromides, through a heated tube maintained at a temperature of the order of 800–900° C., so as to effect brominolysis, and recovering at least one fluorocarbon bromide reaction product.

JOSEPH H. SIMONS.
WILBUR H. PEARLSON.
THOMAS J. BRICE.

REFERENCES CITED

The following references are of record in the file of this patent:

UNITED STATES PATENTS

| Number | Name | Date |
|---|---|---|
| 2,404,374 | Harmon | July 23, 1946 |
| 2,407,246 | Benning et al. | Sept. 10, 1946 |
| 2,413,696 | Downing et al. | Jan. 7, 1947 |
| 2,417,059 | Calfee et al. | Mar. 11, 1947 |
| 2,459,767 | Calfee et al. | Jan. 18, 1949 |